April 21, 1942.  A. A. RUE  2,280,162

COUPLER OR SEPARABLE FASTENER

Filed March 27, 1941

Inventor

Albert A. Rue

By *Clarence A. O'Brien*

Attorney

Patented Apr. 21, 1942

2,280,162

UNITED STATES PATENT OFFICE 2,280,162

COUPLER OR SEPARABLE FASTENER

Albert A. Rue, Raymond, Wash.

Application March 27, 1941, Serial No. 385,559

3 Claims. (Cl. 24—211)

This invention relates to couplers or separable fasteners for detachably connecting members together such as chains, cables, etc., and is especially useful in the logging industry where it is desirable to connect and disconnect chains and cables while under load.

The primary object of this invention is the provision of a device of the above stated character which will provide a positive fastener, one which will be compact and durable and will not accidentally be unfastened and one which may be easily and quickly operated to fasten and unfasten when desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a top plan view illustrating a fastener constructed in accordance with my invention.

Figure 1:
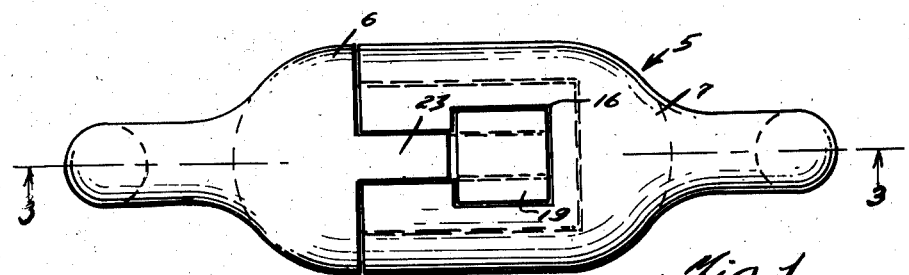
Figure 2:
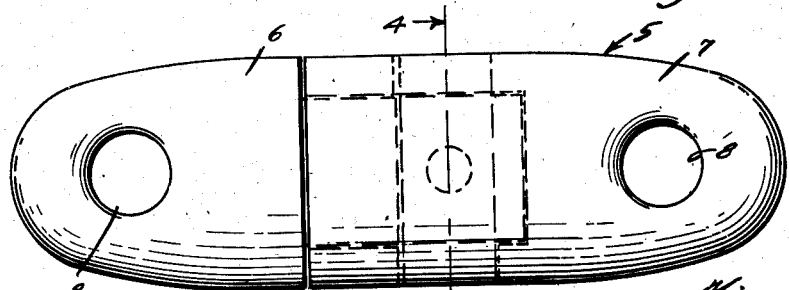
Figure 2 is a side elevation illustrating the device.
Figure 3:
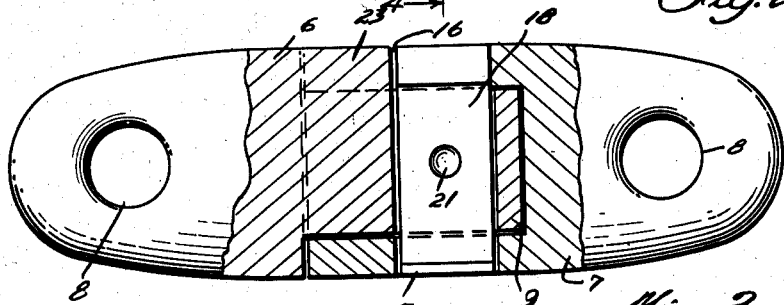
Figure 3 is a sectional view taken on the line 3—3 of Figure 1.
Figures 4, 5:
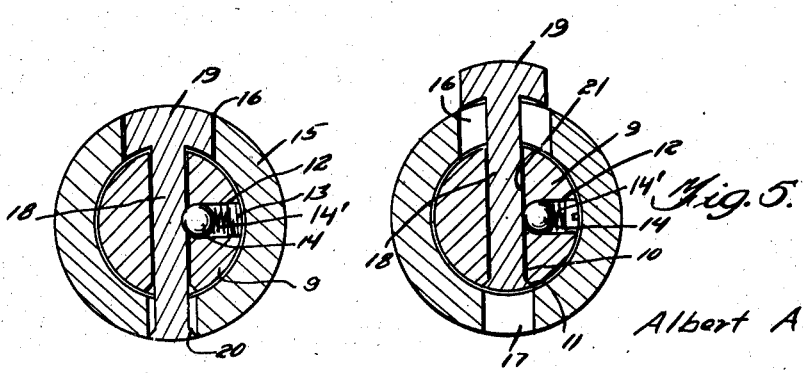
Figure 4 is a transverse sectional view taken on the line 4—4 of Figure 2 showing the pin in locking position.
Figure 5 is a view similar to Figure 4 showing the pin in a releasing position.

Referring in detail to the drawing, the numeral 5 indicates as an entirety a fastener of the separable nature and which includes a male member 6 and a female member 7. The members 6 and 7 have integral therewith eyes 8 to which chains, cables or the like can be easily connected.

The male member includes a reduced cylindrical shank 9 provided with a slot 10 extending therethrough and one end of said slot is flared, as shown at 11. The cylindrical portion 9 of the male member is provided with a chamber 12 closed by a removable plug 13 and has positioned therein a spring 14' influencing ball 14 which may enter partly into the slot 10 by the chamber having a restricted communication with said slot.

The female member 5 includes a casing-like portion 15 provided on one side with a keyhole shaped slot 16 and a straight slot 17 arranged on the opposite side from said keyhole slot. When the cylindrical portion 9 of the male member is inserted into the female member the slot 10 aligns with the slots 16, 17, of the female member so that a key 18 may extend through said slots and thereby secure the male member within the female member. One end of the key is provided with a head 19 which enters and normally lies within a portion of the keyhole shaped slot 16. The other end of the key is upset or mashed, as shown at 20, and may move freely through the slot 17 of the female member but will be prevented from moving through the slot 10 of the male member entirely. The flared portion of the slot 10 receives the mashed portion 20 of the key so as to allow the key to clear the slot 17 when in one of its positions. The key is provided with a notch 21 in which the ball 14 may move for securing the key in position of locking the male member in the female member.

When it is desired to detach the male member from the female member, the key is punched or driven so that the mashed end thereof enters the flared end of the slot 10, the male member due to the keyhole shaped slot of the female member may be readily slid therefrom.

A rib 23 is formed on the cylindrical portion 9 of the male member and enters a portion of the keyhole shaped slot when the male and female members are coupled together which will assist the key in preventing rotation between the male and female members and also acts to align the slot of the male member with the slots of the female member when the male member is inserted therein.

It will be seen that the key will not be lost and always remain attached to the male member either when in securing or releasing position.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a fastener, male and female members each having an eye, said female member including a casing-like portion for receiving the male member, said male member including a reduced portion to enter the female member, said female member having slots and one of the slots opening through the edge of the female member, said reduced portion of the male member having a slot, a rib on the reduced portion of the male member to enter the latter-mentioned slot of the female member, and a key to extend through the slots of the male and female members.

2. In a fastener, male and female members each having an eye, said female member including a casing-like portion for receiving the male member, said male member including a reduced portion to enter the female member, said female member having slots and one of the slots opening through the edge of the female member, said reduced portion of the male member having a slot, a rib on the reduced portion of the male member to enter the latter-mentioned slot of the female member, and a key having headed ends to extend through the slots of the male and female members with the heads normally lying within the slots of the female member, said slot of the male member being of such a size to prevent one of the heads from moving therein and having one end flared to receive the other head to permit the key to clear one of the slots of the female member.

3. In a fastener, male and female members each having an eye, said female member including a casing-like portion for receiving the male member, said male member including a reduced portion to enter the female member, said female member having slots and one of the slots opening through the edge of the female member, said reduced portion of the male member having a slot, a rib on the reduced portion of the male member to enter the latter-mentioned slot of the female member, a key having headed ends to extend through the slots of the male and female members with the heads normally lying within the slots of the female member, said slot of the male member being of such a size to prevent one of the heads from moving therein and having one end flared to receive the other head to permit the key to clear one of the slots of the female member, a spring-pressed ball carried by the male member and partly entering the slot thereof to bear against the key, said key having a notch to receive the ball for releasably securing the key in position of connecting the male and female members by having the heads thereof located in the slots of the female member.

ALBERT A. RUE.